BIOLOGICAL WASTE TREATMENT PROCESS
Filed Nov. 8, 1971 2 Sheets-Sheet 1
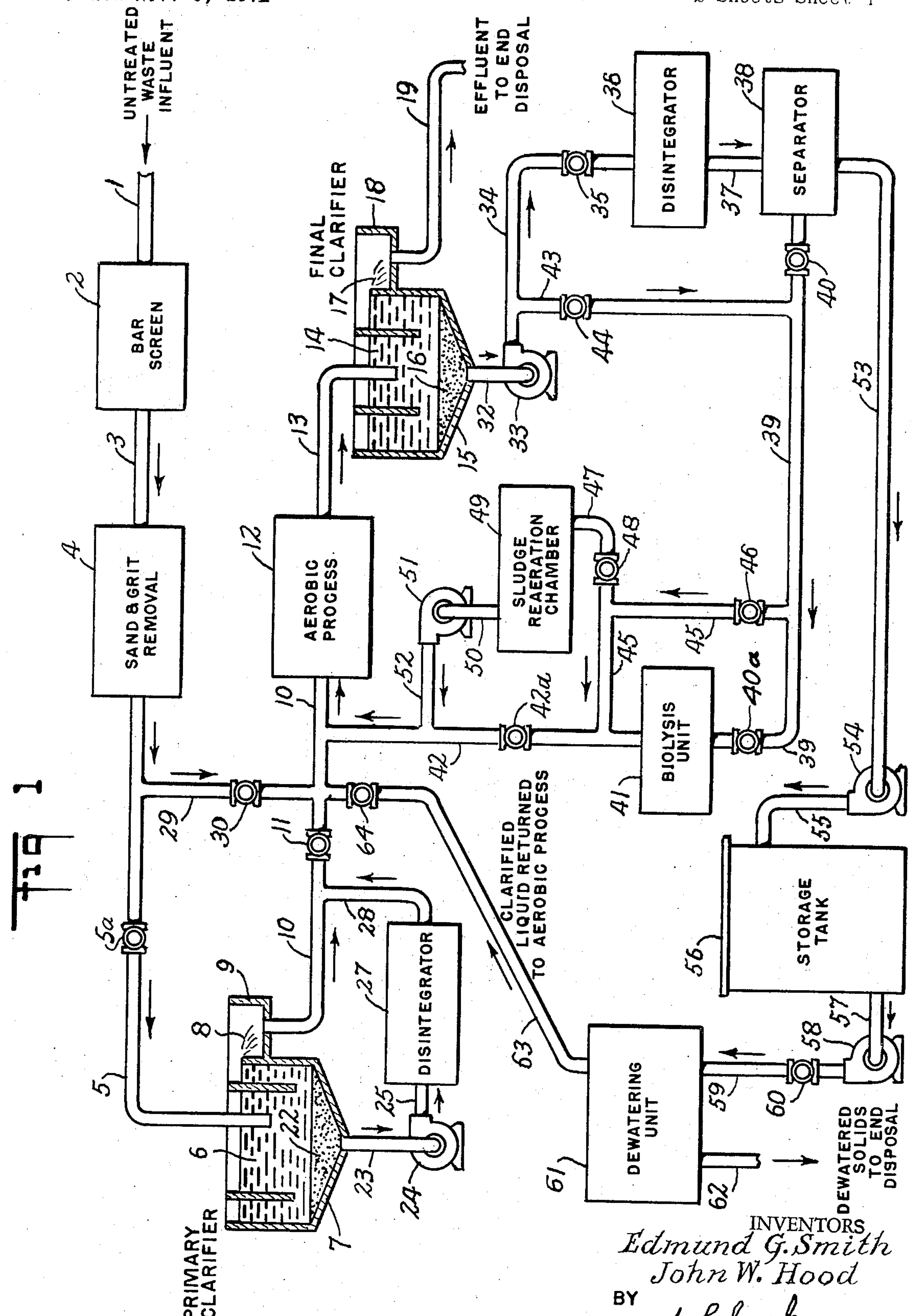
INVENTORS
Edmund G. Smith
John W. Hood
BY N L Leek
ATTORNEY BIOLOGICAL WASTE TREATMENT PROCESS
Filed Nov. 8, 1971 2 Sheets-Sheet 2
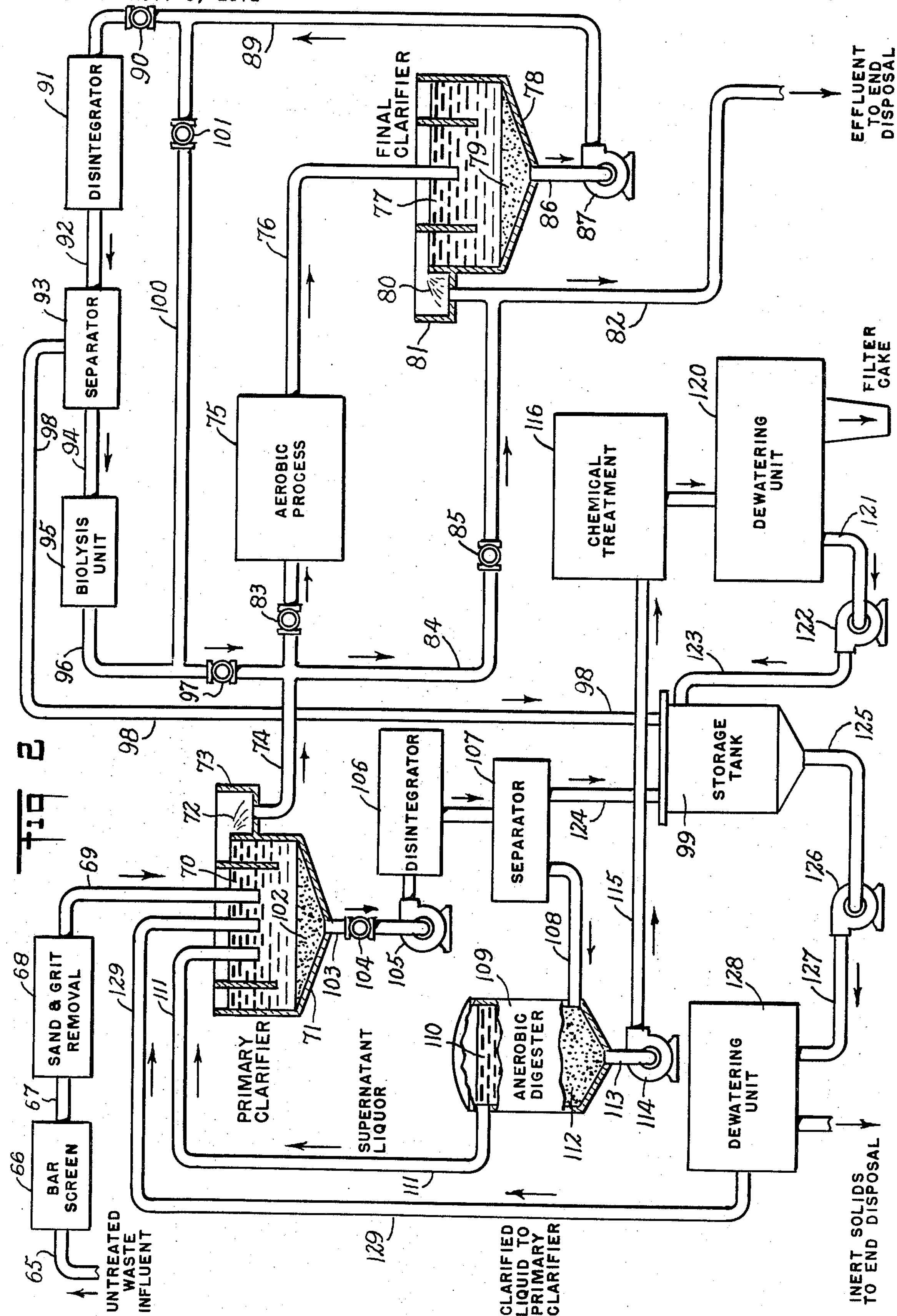

3,806,448
Patented Apr. 23, 1974

3,806,448

BIOLOGICAL WASTE TREATMENT PROCESS

Edmund G. Smith, 206 Watchung Ave., Upper Montclair, N.J. 07043; John W. Hood, 12 Grannan Drive, Corning, N.Y. 14830

Filed Nov. 8, 1971, Ser. No. 196,298
Int. Cl. C02c *1/06*
U.S. Cl. 210—6 9 Claims

ABSTRACT OF THE DISCLOSURE

A method of treating waste material containing biodegradable matter and non-biodegradable matter, having an aerobic treatment step and a final clarifier in which a final sludge is separated. The final sludge is disintegrated and separated into a first fraction containing the biodegradable material and a second fraction containing inert material which is discarded. The first fraction is returned to the aerobic treatment unit with or without microbial biolysis.

This invention relates to an improved process and apparatus for the purification of aqueous wastes by biological oxidation, for the purpose of establishing and maintaining optimum efficiency and uniformity of treatment results, in order to produce the maximum abatement of pollution of receiving waters as a steady state condition, and to substantially reduce the mass of solids to be disposed of.

One object of this invention is to provide an effective means of separating and removing the inert inorganic and non-biodegradable solid matter from various points in the treatment process.

Another object of this invention is to eliminate the need for disposal of large amounts of biodegradable matter from the process which was previously intimately associated with the non-biodegradable matter.

A further object of this invention is to insure the continuity of aerobic process efficiency by removal of said inert matter which in the conventional practice progressively accumulates in the solids inventory of said aerobic process and eventually renders it inoperable.

Another object of this invention is to eliminate the physical and hydraulic problems encountered in plant operation due to the progressive uncontrolled build up of said inert matter in solids inventory, of the biological oxidation process.

A further object of this invention is to materially reduce the scope, complexity and capital cost of the necessary plant facilities.

Another object is to provide an efficient means of minimizing excess sludge production, which is largely responsible for pollution problems involving both aerial and receiving water conditions.

More specific objects and advantages will be apparent as the nature of the invention is more fully disclosed.

The wastes to which this invention is applicable include biodegradable wastes such as domestic sewage; paper mill white water; paper mill delignification liquors; food processing and canning; pharmaceuticals; tannery and leather finishing; distilleries; brewery and winery; packing house; abbatoir; raw garbage and the like.

In accordance with this invention a new method has been devised for the separation and removal of the inert, inorganic and non-biodegradable matter.

We have found that 90–95% process purification efficiency can only be achieved as a steady state condition when means for the removal of the inert, inorganic and non-biodegradable matter is provided, including inert residue and the like resulting from the synthesis of chitinous matter by the organisms from the constituents present in the wsate.

In addition, we have found that the application of microbial biolysis to the aerobic process, in combination with the foregoing separation step improves the overall efficiency of said process because of the substantial reduction in the weight and volume of solid matter to be handled.

Plant operation and process control problems are largely due to the indigenous inert matter which progressively accumulates in the process. For example, the influent of an average domestic sewage treatment plant will contain 2000 pounds more or less of solid matter per million gallons and is generally found to contain 72% biodegradable matter and 28% non-biodegradable or inert matter.

Processes employed in the prior art have been found capable of treating the biodegradable matter but incapable of reducing the amount of inert or non-biodegradable solid matter. The inert matter has been found to accumulate in the system to the extent of 50% or more of the total solids inventory, concomitant with process deterioration. In order to maintain an adequate inventory of active biodegradable matter, it has been necessary to carry a 100% surcharge of solids, 50% of which is composed of inert and detrimental matter.

Heretofore, control of the active biodegradable solid matter in the aerobic process has been effected by the periodic withdrawal of an admixture of biodegradable and non-biodegradable matter from said process. This constituted a serious physical and economic handicap in the practice of the activated sludge process.

The nature of the invention will be better understood by referring to the following description taken in connection with the accompanying drawings in which a specific embodiment has been set forth for the purpose of illustration.

FIG. 1 is a diagrammatic view illustrating the invention as applied to a system for purifying aqueous wastes, in combination with the application of microbial biolysis.

FIG. 2 is a diagrammatic view illustrating the invention as applied to a system for purifying aqueous wastes in combination with microbial biolysis, anaerobic digestion, and mechanical dewatering of the resulting sludge.

Referring to the drawings more in detail, in FIG. 1 the invention is shown as applied to a purification system for treating sewage, industrial waste or garbage and the like in an aerobic process having a primary and final clarifier.

FIG. 1 shows an untreated waste influent pipeline 1 for sewage or industrial waste feeding into a bar screen 2 for removal of the larger sized constituents and thence through pipeline 3 to coarse sand and grit removal unit 4 and thence through pipeline 5 bearing a valve 5*a* to the influent well 6 of primary clarifier 7. The effluent 8 from the primary clarifier overflows into effluent launder 9 and thence through pipeline 10, having opened valve 11 mounted therein, to aerobic process 12.

The primary sludge 22 settled out in primary clarifier 7 passes through pipeline 23 and by means of pump 24 to pipeline 25 and thence through disintegrator 27, such as a hammer mill or cage mill, which reduces the larger particles to a size which renders them readily assimilable by the micro-organisms in the aerobic process, and thence through pipeline 28 to pipeline 10 therein to admix with the primary effluent 8 therethrough to the aerobic process 12.

The aerobic process consists of a mixed liquor wherein a secondary sludge is produced. The mixed liquor from the aerobic process containing the secondary solids is carried by pipeline 13 into the influent well 14 of the final clarifier 15 wherein the separable solids are settled out to form a final sludge 16 and a purified effluent 17 which overflows into launder 18, thence through effluent pipeline 19 to end disposal.

Alternatively, the untreated waste influent may be admitted through pipeline 29 bearing valve 30 to pipeline 10 and thence to aerobic process unit 12, thus permitting operation of a process without a primary clarifier.

The final sludge 16 settled out in final clarifier 15 passes through pipeline 32 to pump 33 and from pump 33 is passed through pipeline 34 and valve 35 to disintegrator 36, similar in function to disintegrator 27, and thence by pipeline 37 to mechanical or hydraulic liquid-liquid separator 38 capable of efficiently separating the liquid fraction containing the biodegradable matter from the liquid fraction containing solids of higher relative particle weight, consisting essentially of the inert, inorganic and non-biodegradable solids. The fraction containing the biodegradable matter passes through pipeline 39 and valve 40 to biolysis unit 41 of the type capable of producing microbial biolysis without producing toxic end products. Such a unit is shown for example in U.S. Pat. No. 3,591,491. From a unit 41 the treated material passes through pipeline 42 and valve 42a to pipeline 10 which leads to the aerobic process 12.

The disintegrator 36 and separator 38 may be bypassed by line 43 having valve 44. The unit 41 may be bypassed through line 45 having valve 46. From line 45 a line 47 with valve 48 leads to sludge reaeration chamber 49 thence through pipeline 50 and pump 51 and pipeline 52 to line 42 and thence to the aerobic process. The arrangement is such that by suitable manipulation of the various valves either the disintegrator or the biolysis unit or both may be bypassed in whole or in part and the reaeration chamber may be used in combination with either or both of such units as desired according to the nature of the material being processed.

The fraction containing the inert material is fed from separator 38 through pipeline 53 and pump 54 and pipeline 55 to storage tank 56 and thence by means of pipeline 57 and pump 58 through pipeline 59 having valve 60 to dewatering unit 61 wherein dewatered solids and a clarified liquid are separated. The dewatered solids are fed to end disposal through pipeline 62 and the clarified liquid is returned to the aerobic process through pipeline 63 having valve 64, to pipeline 10.

By employing the present separation method for the segregation and removal of the inert matter in combination with the application of means of effecting microbial biolysis to the aerobic process, to regulate the production of excess biodegradable matter, the weight and volume of said matter is substantially reduced and critical nutrients are retained in the process.

For example in a one million gallon per day biological oxidation plant having a mixed liquor suspended solids inventory composed of 75% biodegradable and 25% inert, inorganic and non-biodegradable matter, it is necessary to remove three pounds of biodegradable matter in order to effect the removal of one pound of non-biodegradable matter. In the prior art, it is generally found that 683 pounds, more or less, of excess activated sludge solids per million gallons will be produced. This will be composed of 512 pounds of biodegradable material and 171 pounds of inert, inorganic and non-biodegradable material. In order to remove 171 pounds of inert matter, a total of 683 pounds have to be removed.

In accordance with the present invention, the inert, inorganic and non-biodegradable material is separated and removed independently without requiring the removal and disposal of large quantities of biodegradable matter.

FIG. 2 shows an untreated waste influent pipeline 65 for sewage or industrial waste feeding into a bar screen 66 for removal of the larger sized constituents and thence through pipeline 67 to sand and grit removal unit 68 and through pipeline 69 to influent well 70 of the primary clarifier 71. The effluent 72 from the primary clarifier overflows into effluent launder 73 and thence through pipeline 74 and valve 83 to aerobic process 75. The mixed liquor from the aerobic process containing the final sludge is carried by pipeline 76 to influent well 77 of the final clarifier 78 wherein the separable solids are settled out to form a final sludge 79 and a purified effluent 80 which overflows into effluent launder 81 and thence through effluent pipeline 82 to end disposal.

The final sludge 79 carried in pipeline 86 and by means of pump 97 and pipeline 89 having valve 90 may be successively introduced through disintegrator 91 and thence by pipeline 92 to separator 93 wherefrom a liquid fraction containing the biodegradable matter is carried by pipeline 94 to biolysis unit 95 and thence through pipeline 96 having valve 97, pipeline 74, having valve 83 to aerobic process 75. The remaining liquid fraction containing the inert, inorganic and non-biodegradable material, discharged from the separator 93 is carried by pipeline 98 to storage tank 99.

The arrangement is such that by suitable manipulation of the various valves, the disintegrator, separator and biolysis units may be by-passed through pipeline 100 having valve 101, pipeline 96 having valve 97 and pipeline 74 having valve 83 whereby the final sludge 79 carried in pipeline 89 may be conveyed direct to the aerobic process 75, for reuse therein.

Alternatively, by suitable manipulation of the various valves, the primary effluent 72 passing through pipeline 74 as previously described, may be passed through pipeline 84, having valve 85 direct to end disposal.

The primary sludge 102 settled out in primary clarifier 71 passes through pipeline 103 having shut-off valve 104 and by means of pump 105 is conveyed to the disintegrator 106 which is similar in function to disintegrator 91 and thence to mechanical separator 107 which is similar to separator 93 wherein the biodegradable portion is segregated from the non-biodegradable portion. The separated liquid fraction containing the biodegradable portion of the sludge passes through pipeline 108 into anaerobic digester 109. The supernatant liquor 110 is drawn off through pipeline 111 to influent well 70 of primary clarifier 71. The digested solids 112 pass through pipeline 113, pump 114 and pipeline 115 to chemical treatment unit 116 wherein coagulation takes place by the addition of suitable chemical reagents to render the solids filterable and thence to mechanical dewatering unit 120 wherein a dewatered filter cake is produced and discharged to end disposal and a filtrate carrying suspended solids is drawn off through pipeline 121, pump 122 and pipeline 123 to storage tank 90.

Again referring to the mechanical separator 107, the separated liquid portion containing the inert, inorganic and non-biodegradable solids discharged therefrom passes through pipeline 124 to the storage tank 99.

The material contained in storage tank 99 comprising liquid from the mechanical dewatering unit 120 together with the inert portions discharged from the mechanical separators 93 and 106 is drawn off through pipeline 125 and by means of pump 126 passes through pipeline 127 to mechanical dewatering unit 128 wherefrom dewatered solids consisting of inert, inorganic and non-biodegradable solids and a clarified liquid are produced. The clarifield liquid is carried by pipeline 129 to the influent well 70 of primary clarifier 71. The inert solids are discharged to end disposal.

By way of explanation, it should be understood that the aforementioned biological oxidation purification process, which is extensively employed in waste purification, is capable of optimum purification results:

(A) 90–95% biochemical oxygen demand removal
(B) 90–95% suspended solids removal
(C) Maximum clarification of separated liquid
(D) Optimum specific gravity of the activated sludge formed in the process making said matter readily separable from the suspending liquid.
(E) Minimum amounts of by-product solids concomitant with the foregoing maximum process values.

However, in practice without the application of the invention described herein the process efficiency is seriously impaired in a number of physical and economic ways.

For example, progressive uncontrolled accumulation of inert, inorganic and non-biodegradable solids will have a deleterious effect on the biological oxidation process.

The degree of purification of biodegradable wastes by the aerobic process of the type described herein, is directly related to the efficiency of separation of the final sludge from the suspending liquid in the final clarifier and maintenance of active healthy aerobic organisms of the desired classifications in the process. Biological coagulation, the means of creating rapid separation and sedimentation is pronounced under ideal ecological conditions.

The efficiency of separation and sedimentation of the final sludge solids is determined by the sludge volume index, an indication of the volume occupied by the sludge solids after settling over a constant length of time. A high index indicates poor separation and settling of the sludge solids.

Sedimentation and settling of the solids is retarded and often prevented altogether when the inert, inorganic and non-biodegradable solid matter in such aerobic processes is allowed to accumulate so as to overwhelm the active organisms and prevent biological coagulation.

In turn, maintenance of the desired classifications and quantities of aerobic organisms in the process, by creation of favorable environment is essential for establishment of purification of the suspending liquid and the deliberate reduction of the excess population of organisms by endogenous respiration which when prevented from occurring allows an accelerated growth of the undesirable types of organisms, a condition designated as "bulking" in the sedimentation chamber.

Since the ratio of biodegradable to non-biodegradable inert matter is generally found to be approximately 3 to 1, it is obvious that the removal of each pound of inert matter necessitates the involuntary removal of 3 pounds of biodegradable matter. As a consequence, large volumes of diodegradable matter are undesireably removed from the process and constitute serious physical, economic and pollution problems.

By use of the present invention which provides a means of removal of the inert, inorganic and non-biodegradable matter by physical separation, substantially all of the biodegradable matter is retained in the system until it is completely processed, thereby insuring continuity of processing and optimum purification results and optimum pollution abatement.

By employing the biolysis step as shown in FIGS. 1 and 2 in a process as previously described, accurately controlled amounts of microbial biolysis may be applied to the process, whereby substantial reduction in the amount of excess sludge produced in the process results. As a consequence of this substantial reduction, the resulting volume of sludge to be handled in the separation step is also substantially reduced.

For example, it is reliably estimated that an average of 1900 pounds* of sludge solids are removed in a one million gallon per day biological oxidation treatment plant for sewage, of which amount 551 pounds consists of inert, inorganic and non-biodegradable solids. By employing the present invention, facilities are afforded whereby it is possible to remove the inert matter leaving the biodegradable solids in the biological process for complete treatment therethrough.

Likewise, as shown in FIG. 2, which includes the operation of an anaerobic digester, it is possible by the use of the present invention to separate the intimately associated grit and inert matter from the biodegradable matter prior to introduction to the digester, thereby preventing accumulations of the inert matter therein and eliminating the resulting digester failure.

In addition, many mechanical dewatering units produce a filtrate containing considerable amounts of finely divided suspended matter which when returned through the plant interfere with the process operation, adversely affect the process efficiency and are discharged to the receiving stream resulting in gross pollution.

By employing the present invention, which substantially reduces the amount of sludge solids to be disposed of, it becomes economically and practicably feasible to mechanically dewater said solids; return the clarified liquid to the primary clarifier; and convey the dewatered inert solid matter to end disposal.

Likewise, by employing the present invention, the reduction in the amount of sludge entering the anaerobic digester is reflected in reduced amounts of supernatant liquor flowing therefrom to the primary clarifier influent. Due to the potent character of this liquor, said reduction is effective in substantially reducing the organic loading in the ensuing process.

What is claimed is:

1. A method of treating waste containing biodegradable and non-biodegradable solids, said method comprising passing said waste through an aerobic treatment stage and a final clarifier wherein a final sludge is separated from a purified suspending liquid, passing said purified liquid to end disposal, disintegrating the solids in said final sludge and passing the so disintegrated final sludge containing biologically active and other biodegradable solid matter in combination with inert, inorganic and non-biodegradable solids through a liquid-liquid separator wherein said final sludge is separated into two liquid fractions, a first fraction containing biologically active micro-organisms together with other biodegradable solid matter and a second fraction containing essentially inert, inorganic and non-biodegradable solid matter of higher relative particle weight, removing said first fraction through a biolysis stage wherein inactivation of the active organisms is effected without introducing toxic end products, and returning said fraction to said aerobic treatment stage.

2. A method as set forth in claim 1 in which the solids in said final sludge are disintegrated prior to introduction into said aerobic treatment stage.

3. A method as set forth in claim 1 including a primary clarifier wherein settleable solids are collected in the form of a primary sludge and wherein said primary sludge is disintegrated prior to introduction into said aerobic treatment stage.

4. A method as set forth in claim 3 in which the effluent from said primary clarifier is combined with said disintegrated primary sludge for introduction into said aerobic treatment stage.

5. A method as set forth in claim 1 in which said second fraction is passed into a dewatering unit wherein dewater solids and a clarified liquid are separated, said dewatered solids are fed to end disposal and said clarified liquid is returned to said aerobic treatment stage.

*Imhoff and Fair: Sewage Treatment.

6. A method as set forth in claim 1 including a primary clarifier in which settleable solids are separated from the suspending liquid to form an effluent and a primary sludge, separating and removing a first portion containing the inert, inorganic and non-biodegradable solids from said primary sludge and passing the remaining portion of said primary sludge containing the biodegradable solids to an anaerobic digester wherein a digested sludge and a supernatant liquor are produced, passing said digested sludge through a dewatering unit in which a filtrate is separated, and returning said filtrate to said primary clarifier.

7. A method as set forth in claim 6 in which said first portion is combined with said filtrate to form a mixture which is then passed through a second dewatering unit wherefrom disposable solids are removed to end disposal and a clarified liquid is returned to said primary clarifier.

8. A method as set forth in claim 7 in which said second fraction is combined with said mixture and fed to said second dewatering unit.

9. A method as set forth in claim 6 in which said primary sludge is passed through a disintegrator prior to the removal of said first portion.

References Cited

UNITED STATES PATENTS

| | | | |
|---|---|---|---|
| 1,617,014 | 2/1927 | Derleth | 210—7 |
| 469,495 | 2/1892 | Ziegler | 210—201 X |
| 3,591,491 | 7/1971 | Smith et al. | 210—6 |
| 3,489,679 | 1/1970 | Davidson et al. | 210—195 X |
| 2,852,584 | 9/1958 | Komline | 210—10 X |
| 2,246,224 | 6/1941 | Streander | 210—152 |
| 3,383,309 | 5/1968 | Chandler | 210—3 X |

JOHN ADEE, Primary Examiner

R. H. SPITZER, Assistant Examiner

U.S. Cl. X.R.

210—15, 64, 195